May 5, 1970  S. D. SHEFF  3,510,154
ROTARY CAM FASTENER
Filed Sept. 17, 1968
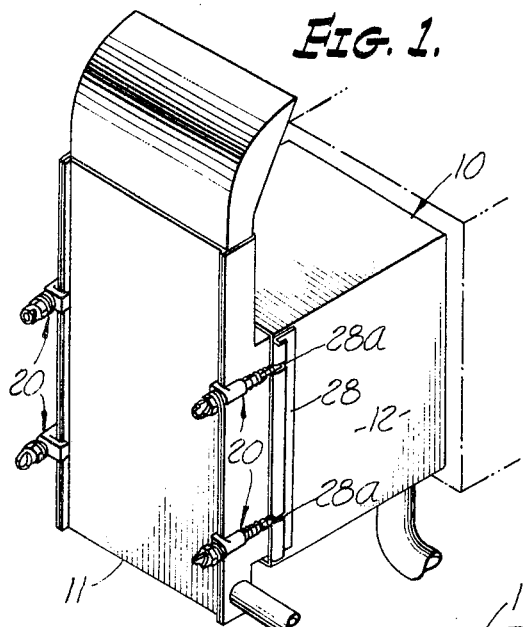
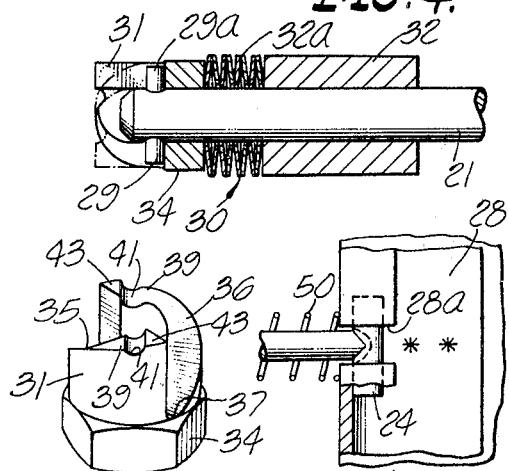
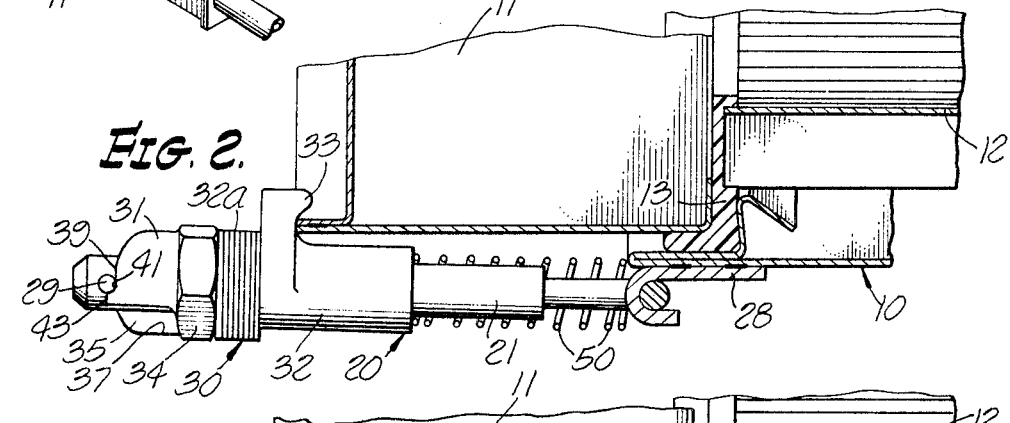
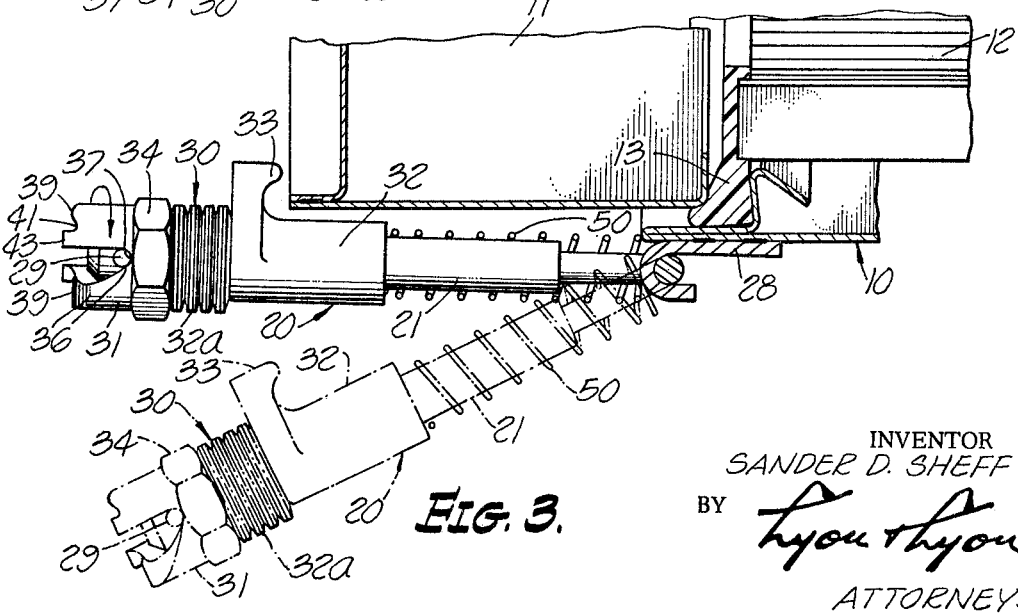
INVENTOR
SANDER D. SHEFF
BY
*Lyon Lyon*
ATTORNEYS United States Patent Office 3,510,154
Patented May 5, 1970

3,510,154
ROTARY CAM FASTENER
Sander D. Sheff, Los Angeles, Calif., assignor to Farr Company, El Segundo, Calif., a corporation of California
Filed Sept. 17, 1968, Ser. No. 760,157
Int. Cl. F16l 55/00; A44b 21/00; E05c 5/00
U.S. Cl. 285—39
17 Claims

ABSTRACT OF THE DISCLOSURE

A cam actuated fastener apparatus to seal together in an air-tight fashion filter housings which are separated by a flexible gasket. The fastener is pivotably mounted on one of the filter housings and is attachable to the other filter housing. The axially moving parts of the fastener are mounted on a shaft and remain in fixed assembly when the fastener is in an open position.

---

This apparatus relates to a fastener device and is particularly directed to improvements in connecting filter housings.

Such filter housings contain disposable filters, but the housings are re-used indefinitely. The housings must be separated periodically in order to remove the disposable filters, thus requiring a dis-engageable connection between the filter housings.

An ordinary nut and bolt could be used, but oftentimes the filter housings are installed in areas where there is insufficient space to operate a tool necessary to turn a nut or bolt. Because this device can be disengaged by less than a one-half rotation of the device, very little space is required for a tool to engage or disengage it.

Furthermore, these filter housings are usually exposed to an environment causing corrosion to a fastener which often would freeze a nut and bolt fastening arrangement solid, making it difficult to remove. This device is designed to operate in spite of corrosion.

While this fastener is not subject to the limitations of a nut and bolt, it still transmits sufficient axial force to compress the gasket separating the filter housings to provide an air or liquid tight seal.

This device can be used over and over, requiring a minimum amount of time to operate and the parts are so arranged that they will not disensemble when in an inoperable position.

Other advantages of this invention will appear from the following description in the accompanying drawings wherein:

FIG. 1 is a perspective view showing several of the devices in conjunction with the two filter housings.

FIG. 2 is a top plan view showing the device in a closed or locked position.

FIG. 3 is a top plan view showing the device in an open or unlocked position with phantom lines to illustrate the device after it is pivotably moved away from one of the filter housings to permit separation of the filter housings.

FIG. 4 is a partial sectional view of one end of the device.

FIG. 5 is a partial plan view of the pivotably mounted end of the device.

FIG. 6 is a perspective view of the cam portion of the device.

Referring to the drawings, a two-stage filter housing assembly generally designated 10, includes an inertial separator type first stage housing 11 and a replaceable pass-through media type filter housing 12. A flexible gasket 13 separates the two filter housings 11 and 12 and when compressed serves to provide an air and water tight connection.

The fastener device is generally designated 20. FIG. 1 illustrates the use of four such fastener devices to seal together the filter housings 11 and 12, but it is evident that more or fewer fasteners could be used. The fastener device 20 includes a shaft 21. Shaft 21 is cylindrical in shape with one end of the shaft having a smaller diameter than the other. At the end of the shaft having the smaller diameter is a cross-bar 24 which is perpendicular to the shaft 21 and together with it forms a T configuration. A continuous jacket 28 is welded to the filter housing 12 and has spaced slots 28a to receive the cross-bar 24. The jacket 28 prevents any movement of the shaft 21 except to allow it to pivot about the axis of the cross-bar 24.

Press fitted within the larger portion of the diameter shaft 21 are follower pins 29 and 29a which extend outwardly from the shaft 21 and parallel to the cross-bar 24.

A sleeve means, generally designated 30, is mounted coaxially about the shaft 21 and rides axially on the shaft. The sleeve means 30 includes a rotary cam 31 and a cylindrical sleeve 32. Positioned between the rotary cam 31 and the cylindrical sleeve 32 is a series of belleville washers to form a spring 32a to provide the necessary deflection and force required by the fastener device 20. The cylindrical sleeve 32 is provided with a hook 33 which is adapted to engage the filter housing 11 and when in such engagement prevents the shaft 21 from pivoting about the axis of the cross-bar 24.

The rotary cam 31 has a hexagonally shaped collar 34 which provides a means whereby a common tool such as a wrench can grasp and rotate the cam 31 about the shaft 21. A pair of identical inclined circular arcs 35 and 36, correspondingly 180° apart, extend circumferentially on the cam 31. Because the arcs are identical, for purposes of simplicity, only one will be described in detail. Arc 35 begins at a low point 37 and extends on a smooth curve to a high point 39. Immediately following the high point 39 is a concave seat 41 which is followed by a stop 43. Arcs 35 and 36 are also the cam surfaces which follower pins 29 and 29a engage, respectively. These pins 29 and 29a also prevent the fastener device 20 from disensembling when in an inoperable or open position.

Mounted coaxially on the shaft 21 between the cylindrical sleeve 32 and the cross-bar 24 is a low-load compression spring 50. Compression spring 50 holds the sleeve 32, the washers 32a and the rotary cam 31 away from the cross-bar 24 when the fastener device 20 is in an inoperable or open position.

By preventing the sleeve 32, cam 31 and washers 32a from sliding along the shaft 21 when the fastener device 20 is in an open position, the hook 33 will always be in a proper position for engagement with the first-stage inertial separator housing 11. Furthermore, the compression spring 50 serves to prevent the fastener device 20 from becoming disengaged from the jacket 28 when the fastener device 20 has been pivotably moved away from separator housing 11.

The operation of the device is as follows:

The fastener device 20 is pivoted about the axis of the cross-bar 24 until the hook 33 is in line to engage housing 11. The rotary cam 31 is then rotated relative to the shaft 21 with the follower pins 29 and 29a slidably engaging and moving upward on the cam surfaces 35 and 36, respectively. The cam rise causes the cam 31 to slide forward compressing the spring 32a and forcing the sleeve 32 forward until the hook 33 engages the filter housing 11. This in turn pushes the filter housing 11 forward compressing the gasket 13 until horizontal travel is completed. The follower pins 29 and 29a continue to follow the respective cam surfaces and continue to compress the spring 32a between the cam 31 and the sleeve 32 until they pass over the high points on the arcs 35 and 36, respectively, and into the seas to the lock the fastener device in position and prevents loosening as a result of vibration.

To disengage the fastener 20 the rotary cam 31 is merely rotated in an opposite direction and with enough force to unseat the follower pins 29 and 29a. This allows the hook 33 on the sleeve 32 to move away from the filter housing 11 and further allows the fastener device 20 to be pivoted away from the filter housing 11 thereby enabling the two filter housings 11 and 12 to be separated. The compression spring 50 holds the fastener 20 to the jacket 28 and prevents axial movement of the sleeve means towards cross-bar 24 during the separation of the filter housings.

The fastener operates quickly and easily by the half turn of the cam. It also provides the required axial force necessary to seal the housings together in an air and water tight fashion, but does not deteriorate when exposed to various environments and will not disensemble when in an nonoperative position.

Having fully described my invention, it is to be understood that I am not to be limited to the details herein set forth, but that my invention is of the full scope of the appended claims.

I claim:

1. In a fastener device for use with a pair of filter housings separated by a flexible gasket, the combination of: a shaft, means to connect said shaft to one of the filter housings, sleeve means slidably and rotatably mounted on said shaft, said sleeve means including a cam surface extending circumferentially about said sleeve means, engaging means on said shaft slidably contacting said cam surface and causing said sleeve means to move axially forward and backward when said sleeve means is rotated relative to the shaft, and means on said sleeve means to attach to the other filter housing as the sleeve means is moved forward by the relative rotation to compress the flexible gasket and connect the filter housings.

2. The combination set forth in claim 1 in which said rotary cam surface is provided with a seat to lock said engaging means when the filter housings are sealed together.

3. The combination set forth in claim 1 in which said engaging means comprises a follower pin mounted on and perpendicular to said shaft.

4. The combination set forth in claim 1 in which said means to connect said shaft to one of the filter housings is a cross-bar at the end of said shaft which allows the fastener device to pivot away from the filter housings when the fastener device is in an inoperable position.

5. The combination set forth in claim 2 wherein a spring is mounted axially on said shaft between said sleeve means and said means connecting said shaft to one of the filter housings to prevent said sleeve means from moving axially towards said connecting means when the fastener device is in an inoperable position.

6. The combination set forth in claim 1 in which said sleeve means includes a rotary cam and a cylindrical sleeve which are separately movable on said shaft, said cam surface being on said rotary cam and said sleeve having the said means to engage the other filter housing.

7. The combination set forth in claim 6 in which said rotary cam is provided with means engagable by a tool for manually turning said rotary cam.

8. The combination set forth in claim 6 in which said rotary cam has a pair of cam surfaces extending circumferentially about said rotary cam, said cam surfaces being indentical inclined circular arcs and correspondingly 180° apart with said engaging means slidably contacting both of said cam surfaces.

9. The combination set forth in claim 8 in which said engaging means comprises a pair of follower pins mounted on and perpendicular to said shaft and 180° apart.

10. The combination set forth in claim 6 in which said sleeve means also includes a resilient means positioned between said rotary cam and said sleeve to provide a compressive axial force when said contacting means on said sleeve contact the other filter housing.

11. The combination set forth in claim 10 in which said resilient means comprises belleville washers mounted in series.

12. The combination set forth in claim 11 wherein said cam surfaces are identical inclined arcs correspondingly 180° apart and said follower pins are mounted 180° apart.

13. A fastener device used to connect in an air and fluid tight fashion a pair of filter housings which are separated by a flexible gasket, comprising: a shaft having one end pivotably mounted on one of the filter housings, a cylindrical sleeve slidably mounted on said shaft and having a hook to contact the other filter housing, a rotary cam slidably and rotatably mounted on the other end of said shaft and having a pair of cam surfaces extending circumferentially about said rotary cam, resilient means slidably mounted on said shaft between said cam and said sleeve and contacting said cam and said sleeve, a pair of follower pins mounted on said other end of said shaft, said follower pins slidably contacting said cam surfaces and causing said cam and said resilient means and said sleeve to move axially forward and backward when said cam is rotated relative to the shaft, and said hook contacting the other filter housing as the sleeve moves forward to compress the flexible gasket and connect the filter housings.

14. The combination set forth in claim 13 wherein each of said cam surfaces is provided with a concave circular notch located 180° apart and immediately after the maximum deflection of said arcs to lock said follower pins when said filter housings are connected.

15. The combination set forth in claim 14 wherein said cam surfaces are identical inclined arcs correspondingly 180° apart and said follower pins are mounted 180° apart.

16. A filter apparatus having two filter stages, each stage contained in a separate filter housing, one of the filter housings containing a removable and disposable filter cartridge and having a flange of resilient material contacting the other filter housing to form a seal when the two filter housings are connected, wherein the improvement comprises: a plurality of fastener devices adapted to connect the filter housings, each fastener device including a cylindrical shaft, one end of said shaft having a cross-bar perpendicular to the axis of said shaft and pivotably mounted on one of the filter housings, the other end of said shaft having a pair of follower pins extending outward and perpendicular to said shaft, a sleeve slidably mounted on said shaft between said pins and said cross-bar, said sleeve having a hook to contact the other filter housing, resilient means slidably mounted on said shaft between said pins and said sleeve and contacting said sleeve, a rotary cam slidably and rotatably mounted on said shaft between said pins and said resilient means, said cam having a pair of ends, one end of said cam contacting said resilient means, said other end of said cam including a pair of cam surfaces extending circumferentially about said cam and said follower pins slidably engaging said cam surfaces and causing said cam and said resilient means and said sleeve to move axially forward and backward when said cam is rotated relative to said shaft whereby said hook contacts the other filter housing when said sleeve moves forward to compress the flexible gasket and connect the filter housings.

17. The combination set forth in claim 16 wherein each of said cam surfaces is provided with a concave circular notch located 180° apart and immediately after the maximum deflection of said arcs to lock said follower pins when said filter housings are connected.

References Cited

UNITED STATES PATENTS

| | | | |
|---|---|---|---|
| 1,127,558 | 2/1915 | Wile | 24—134 |
| 1,489,965 | 4/1924 | Prentice | 292—129 |
| 1,609,164 | 11/1926 | Gilmore | 292—114 X |
| 1,784,224 | 12/1930 | Cummins | 292—114 |
| 2,134,314 | 10/1938 | O'Donnell | 292—364 X |
| 2,793,786 | 5/1957 | Walker | 292—67 X |
| 3,379,460 | 4/1968 | Allyn | 285—364 X |

FOREIGN PATENTS 270,182  12/1929  Italy.

THOMAS F. CALLAGHAN, Primary Examiner

U.S. Cl. X.R.

24—263; 285—320; 292—67